United States Patent [19]

Muller et al.

[11] Patent Number: 5,100,746
[45] Date of Patent: Mar. 31, 1992

[54] PROCESS FOR PRODUCTION OF A MULTI-LAYER ASSEMBLY FOR AN ELECTROCHEMICAL GENERATOR

[75] Inventors: Daniel Muller, Pau, France; Michel Gauthier, LaPrairie; Bruno Kapfer, Longueuil, both of Canada

[73] Assignees: Societe Nationale Elf Aquitaine, Courbevoie, France; Hydro-Quebec, Montreal, Canada

[21] Appl. No.: 337,522

[22] PCT Filed: Jun. 16, 1988

[86] PCT No.: PCT/FR88/00312
§ 371 Date: Feb. 21, 1989
§ 102(e) Date: Feb. 21, 1989

[87] PCT Pub. No.: WO88/10519
PCT Pub. Date: Dec. 29, 1988

[30] Foreign Application Priority Data
Jun. 18, 1987 [FR] France ............... 87/08541

[51] Int. Cl.⁵ .......................................... H01M 10/04
[52] U.S. Cl. ........................................ 429/94; 429/152; 29/623.3; 29/623.5
[58] Field of Search ................... 429/94, 152, 153; 29/623.3, 623.5

[56] References Cited

U.S. PATENT DOCUMENTS 4,345,954 12/1985 Panchu ..................... 156/87

FOREIGN PATENT DOCUMENTS 0146245 6/1985 European Pat. Off. .
0147929 7/1985 European Pat. Off. .
0165827 12/1985 European Pat. Off. .
1300596 8/1969 Fed. Rep. of Germany .
2148586 5/1985 United Kingdom .

OTHER PUBLICATIONS

Chemical & Engineering, vol. 63, No. 20, May 20, 1985, D. F. Shriver et al.: "Solid Ionic. These Unusual Materials Applications in High-Energy-Density", pp. 42–57.

Primary Examiner—Stephen J. Kalafut
Attorney, Agent, or Firm—Oblon, Spivak, McClelland, Maier & Neustadt

[57] ABSTRACT

Electrochemical cells containing lithium and a solid polymer electrolyte in the form of thin films are produced by making multilayer assemblies from double-layer solid polymer electrolyte/composite positive electrode sub-assemblies which are subsequently associated with the other constituent layers of the cell so that the multilayer assembly so obtained comprises a layer of a metal of low ductility. Cells may be made from multilayer assemblies by stacking, rolling or bending techniques.

56 Claims, 3 Drawing Sheets

PROCESS FOR PRODUCTION OF A MULTI-LAYER ASSEMBLY FOR AN ELECTROCHEMICAL GENERATOR

BACKGROUND OF THE INVENTION

The present invention concerns a process for the production of a multi-layer assembly for production of an electrochemical generator with low thickness. It also relates to the multi-layer assembly obtained, and also to production of the complete generator. It is particularly applicable to the production of generators in which the electrolyte is solid and comprised of an ion compound dissolved in an elastomer macromolecular material. The principle of these polymer electrolyte generators is well known to a person skilled in the art, it is particularly described in the French patent published under No. 2 542 322 and entitled: "Macromolecular Material with Ion Conduction Comprised of a Salt in Solution in a Copolymer." Such generators, according to the prior art, are comprised of a positive electrode, an electrolyte and a negative electrode, these three elements being sandwiched between two metallic collectors.

As indicated in the French patent published under No. 2 442 514, the interesting aspect of these generators according to the prior art essentially rests in the fact that they form an elementary multi-layer assembly, in which each of the layers is flexible, has a very low thickness (<80 microns), and adheres strongly to the adjacent layers, the overall thickness of the elementary multi-layer assembly generally being between 30 and 300 microns.

To prepare generators with high energy capacity which use relatively large surfaces, one must produce either stacked or coiled or even various folded forms of such elementary multi-layer assemblies.

In the case of coils or folds, the elementary multi-layer assemblies are subjected to major bending stress. It is known that in order to fold or bend two non-ductile superimposed films without damage, it is necessary that the two films are able to glide relative to one another at the folds or bends. If the two non-ductile films are made into a unit by means of an adhesive, even if it is elastic and only a thin layer, major restrictions are produced at the fold or bend, which result either in rupture of the exterior film or wrinkling of the interior film.

In the case of thin-film electrochemical generators, in other words generators formed of the aforementioned elementary multi-layer assembly, rupture of one of the layers as well as folding of the other results in destruction of the generator, either by rupture of the contact or by a permanent short circuit.

SUMMARY OF THE INVENTION

One aim of the invention it to propose a process for the production of a multi-layer assembly which makes it possible to assemble a thin-film electrochemical generator with a solid polymer electrolyte, using not only stacking techniques, but also coiling or folding techniques, the said process being easy to implement in a continuous manner, thanks to the excellent properties of flexibility, adhesiveness and mechanical resistance of the elements used to form the said multi-layer assembly.

The process according to the invention for the production of a multi-layer assembly which can be used for the assembly of thin-film electrochemical generators with a solid polymer electrolyte, working with stacking, coiling or folding, essentially consists of applying to one another at least one two-layer sub-assembly comprised of a layer of solid polymer electrolyte adhered to a composite positive electrode layer, and designated in the following by the term "electrolyte/electrode sub-assembly," a lithium layer or a layer of a ductile alloy based on lithium, and a layer of a metal with low ductility, carrying out this operation in such a manner that the layer of lithium or lithium-base ductile alloy does not come into contact with a composite positive electrode layer.

Advantageously, the electrolyte/electrode sub-assembly used in the operations which result in the multi-layer assembly is deposited onto a carrier, the said carrier consisting either of a layer of a metal with low ductility or even of a film of plastic which can be peeled off, in other words easily removed from the material to which it adheres, the said film being made of an inert plastic material and having good mechanical resistance, for example polypropylene or polyethylene. When a peel-away plastic film carries the electrolyte/electrode sub-assembly, the said film is preferably arranged on the side of the sub-assembly which does not come into contact with the other layers involved in the sub-assembly to form the multi-layer assembly.

The electrolyte/electrode sub-assembly can be obtained by any known method and particularly by a method of spreading such as described in U.S. Pat. No. 4,968,319.

The layer of lithium or ductile lithium-base alloy can be applied to the layer which receives it by any known method, particularly using a technique in which the layer of lithium or lithium-base alloy is carried on a thin film of inert plastic material, particularly polyethylene or polypropylene, demonstrating controlled adhesion to the lithium, in such a way that the bond between the layer of lithium or lithium-base alloy and the film of plastic material is sufficient to allow manipulation of the said carried layer, but less than the bond between the lithium and the layer of the material to which the lithium-base layer is applied.

The multi-layer assembly obtained by the process according to the invention comprises a single layer of a metal with low ductility, with which the layers of the other components of the generator are associated.

According to a first embodiment, the multi-layer assembly produced is an assembly of four layers, which, in addition to the layer of metal with low ductility, comprise three other layers, namely a composite positive electrode layer, a solid polymer electrolyte layer, and a layer of lithium or ductile lithium-base alloy, the said three other layers being arranged in such a way in the multi-layer assembly that the layer of metal with low ductility is separated from the solid polymer electrolyte layer by one of the remaining layers.

In particular, in this type of multi-layer assembly according to the first embodiment, the solid polymer electrolyte layer is sandwiched between the composite positive electrode layer and the layer of lithium or ductile lithium-base alloy, and is in contact either with the composite positive electrode layer or with the layer of lithium or ductile lithium-base alloy. In this latter case, the metal with low ductility is a metal which does not react with lithium.

When the layer of lithium or ductile lithium-base alloy in these specific multi-layer assemblies with four layers is visible, it can be covered with a film of an insulating and ductile polymer material. When a lithium electrochemical generator is produced by coiling such a multi-layer assembly provided with a insulating and ductile polymer film, the said film plays the role of an insulation between two consecutive series or coils of the multi-layer assembly.

According to a second embodiment, the multi-layer assembly produced is an assembly of six layers, which, in addition to the layer of metal with low ductility, comprise five more layers, namely two composite positive electrode layers, two solid polymer electrolyte layers, and a layer of lithium or ductile lithium-base alloy, the said five other layers being arranged in such a way in the multi-layer assembly that the layer of metal with low ductility is separated from at least one of the solid polymer electrolyte layers by a composite positive electrode layer, and that the layer of lithium or ductile lithium-base alloy is separated from at least one composite positive electrode layer by a solid polymer electrolyte layer.

In a first method of implementation of the second embodiment of the multi-layer assembly, the two composite positive electrode layers, the two solid polymer electrolyte layers and the layer of lithium or ductile lithium-base alloy are situated on the same side of the layer of metal with low conductivity.

In a second method of implementation of the second embodiment of the multi-layer assembly, a composite positive electrode layer, a solid polymer electrolyte layer and the layer of lithium or ductile lithium-base alloy are arranged on one side of the layer of metal with low ductility, while a composite positive electrode layer and a solid polymer electrolyte layer are arranged on the other side of the said layer of metal with low ductility.

With these multi-layer assemblies, it is possible to produce a complete electrochemical generator by stacking, coiling or folding. When coiling the multi-layer assembly of the first method of implementation of the second embodiment, it is clear that the composite positive electrode layer at the end will come into contact with the free surface of the layer of metal with low ductility. In the same way, when coiling the multi-layer assembly according to the second method of implementation of the second embodiment, the solid polymer electrolyte layer at the end can come into contact with the free surface of the layer of lithium or ductile lithium-base alloy. Thus, complete coiled electrochemical generators are obtained, for which the collection of current can take place, for the positive electrodes, by using the layer of metal with low ductility, and using the layer of lithium or ductile lithium-base alloy as the negative current collector, these two collectors operating at each of their two sides.

It is understood that one of the advantages of the multi-layer assemblies produced by the process according to the invention resides in the fact that an assembly is obtained which comprises a single layer of metal with low ductility, to which layers of deformable and/or elastic material are associated, either on one side or on both sides, which demonstrate good adhesion between one another, due to the presence of an amorphous macromolecular material, either in the composite positive electrode or in the solid polymer electrolyte, such an assembly being easy to bend or fold, without rupture or wrinkling.

To produce a multi-layer assembly according to the first embodiment described above, and comprising a composite positive electrode layer in contact with the layer of metal with low ductility, one proceeds in the following manner:

First of all, an electrolyte/electrode sub-assembly is produced, carried by a layer of metal with low ductility, particularly aluminum, nickel, copper or stainless steel, for example by depositing a composite positive electrode layer onto the layer of metal with low ductility, then applying a solid polymer electrolyte layer onto the positive electrode layer. Onto the solid polymer electrolyte layer of the supported electrolyte/electrode sub-assembly obtained, a layer of lithium or ductile lithium-base alloy is then deposited, using any known method to do this, particularly the method using a peel-away plastic film as mentioned above.

Also, the electrolyte/electrode sub-assembly carried by the layer of metal with low ductility can be formed by applying an electrolyte/electrode sub-assembly carried by a peel-away plastic film on the electrolyte side onto a layer of metal with low ductility, by proceeding in such a manner as to bring the electrode layer of the sub-assembly into contact with the low-ductility metal. To carry out deposition of the layer of lithium or ductile lithium-base alloy to the electrolyte layer of the sub-assembly supported by the layer of metal with low ductility, the peel-away plastic film covering the said electrolyte layer is first removed.

The assembly with four layers obtained as described above, where the layer of lithium or ductile lithium-base alloy can be covered by a peel-away plastic film if the specific aforementioned technique of depositing the said layer using such a film has been used, can also make it possible to produce a complete generator, for example by coiling or folding, when the said assembly comprises a peel-away plastic film or also by superposition of a plurality of such assemblies when the peel-away plastic film has been removed from each of the superimposed four-layer assemblies. In the latter case, the free side of the layer of lithium or ductile lithium-base alloy comes into contact with the layer of metal with low ductility and the adjacent assembly, and it is therefore necessary to choose the metal with low ductility from among those which do not react with lithium, particularly nickel, copper, stainless steel.

The aforementioned assembly of four layers can also be obtained by depositing a layer of lithium or ductile lithium-base alloy, the said layer either being carried or not carried on a film of peel-away plastic, onto the solid polymer electrolyte layer of an electrolyte/electrode sub-assembly, then applying a layer of metal with low ductility to the solid polymer electrolyte layer of the assembly obtained, after having removed the peel-away film covering the said positive electrode layer, if it is present.

Based on the four-layer assembly obtained by one or the other aforementioned variations of the process according to the invention, an assembly of six layers can be obtained, corresponding to one or the other of the first or second method of implementation of the second embodiment of the multi-layer assemblies defined above.

To obtain a six-layer assembly according to the first method of implementation of the second embodiment, an electrolyte/electrode sub-assembly, preferably supported on the positive electrode side by a peel-away plastic film, is applied to the layer of lithium or ductile lithium-base alloy of the four-layer assembly, after having removed the peel-away film which covers this layer, if it is present, working in such a way that this layer of lithium or lithium-base alloy is in contact with the solid polymer electrolyte layer of the electrolyte/electrode sub-assembly. The said electrolyte/electrode sub-assembly, whether or not it is supported, is preferably obtained by a technique of spreading such as described by the patent application cited above.

To obtain a six-layer assembly according to the second method of implementation of the second embodiment, an electrolyte/electrode sub-assembly, preferably supported on the electrolyte side by a peel-away plastic film, is applied to the free side of the layer of metal with low ductility of the four-layer assembly, working in such a way that the said free side is in contact with the composite positive electrode layer of the electrolyte/electrode sub-assembly.

The six-layer assembly can also be obtained according to the second method of implementation of the second embodiment by applying an electrolyte/electrode sub-assembly, preferably supported by a peel-away plastic film on the electrolyte side, to both sides of a layer of metal with low ductility, then depositing a layer of lithium or ductile lithium-base alloy onto one of the sides of the partial assembly obtained in this way, after having removed the peel-away plastic film from this side, if it is present, with the layer of lithium or ductile lithium-base alloy being supported by a peel-away plastic film.

During final assembly of the electrochemical generator based on one or the other of the six-layer assemblies obtained as indicated above, the peel-away plastic film or films which might be present on the sides of the said assemblies are removed before these assemblies are subjected to any coiling, stacking or folding operations which result in the production of two-sided generators, in which the lithium or lithium-base alloy as well as the layer of metal with low ductility which constitutes the positive collector are utilized on both their sides.

It is also possible to produce a four-layer assembly according to the first embodiment, by the process according to the invention, for which the layer of lithium or ductile lithium-base alloy is in direct contact with the layer of metal with low ductility, this latter metal therefore being chosen from among those which do not react with lithium. In this variation, a layer of lithium or ductile lithium-base alloy is first of all applied to a layer of metal with low ductility and no reaction with lithium, for example nickel, copper, stainless steel, then an electrolyte/electrode sub-assembly is applied to the lithium or lithium-base alloy side of the product thus formed, working in such a way that the electrolyte of the said sub-assembly comes into contact with the lithium or lithium-base alloy. Advantageously in this variation, the layer of lithium or ductile lithium-base alloy applied to the layer of metal with low ductility is supported by a peel-away plastic film, the said film being removed to allow application of the electrolyte/electrode sub-assembly. In the same way, the said sub-assembly can be supported on the electrode side by a peel-away plastic film, which is removed at the end of the operation.

The four-layer assembly obtained in this way is a thin-film lithium electrochemical generator, complete with a free positive electrode. By superimposing n analogous multi-layer elements onto the said assembly, and applying a positive collector to the last positive electrode layer, a generator is obtained whose voltage is equal to n times the nominal voltage of the four-layer assembly. In the generator obtained, the layer of metal with low ductility which remains visible after superimposition of n assemblies plays the role of a negative collector. Since the free positive does not adhere to the free side of the said negative collector before heating, the groupings of n cells can be coiled or folded together, and they will only adhere after a heating step.

The aforementioned four-layer assemblies for which the metal with low ductility is in contact with the lithium or ductile lithium-base alloy can also be assembled in parallel. To do this, such a four-layer assembly is applied to each of the sides of a layer of metal with low ductility, which can be such a metal as nickel, copper, aluminum, stainless steel, working in such a way that the positive electrode of each of the assemblies applied comes into contact with the low-ductility metal.

Application of the electrolyte/electrode sub-assembly to the layer of metal with low ductility or to the layer of lithium or ductile lithium-base alloy, as well as application of the partial assemblies obtained to the layer of metal with low ductility or to the layer of lithium or lithium-base alloy, which leads to the production of multi-layer assemblies, is preferably achieved by lamination between two rollers, the temperature of which can be controlled and which turn in opposite directions and at the same speed, these two rollers exerting an adjustable pressure on the product to be assembled, which makes it possible to obtain good adhesion without, however, producing any noticeable effects of lamination, friction, etc.

One of the particularly interesting aspects of these multi-layer products resides in the fact that based on an electrolyte/electrode sub-assembly, multi-layer assemblies according to the first embodiment or multi-layer assemblies according to the second embodiment can be obtained.

Another point of interest of these multi-layer products lies in the fact that during all the steps leading to final assembly of the generator, each of the partial assemblies is connected to at least one support which has mechanical properties compatible with implementation of the process on machinery which operates continuously.

The invention and its advantages will be better understood when reading the following examples of its embodiments, which are given as an illustration and not limiting in any way, with reference to the attached drawings, where:

DETAILED DESCRIPTION OF THE PREFERRED EMBODIMENTS

Figure 1:
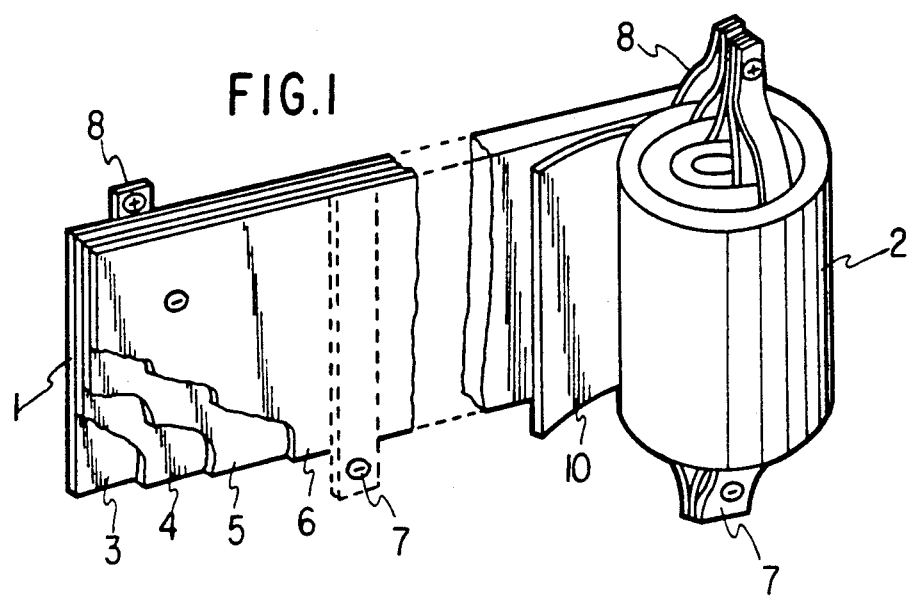
FIG. 1 represents a multi-layer assembly in accordance with the first embodiment of the invention and the final electrochemical generator obtained by coiling of the said assembly.

FIG. 1 shows a multi-layer assembly (1) produced according to the first embodiment mentioned above, as well as a final electrochemical generator (2) obtained by coiling the multi-layer assembly. This multi-layer assembly (1) comprises a first layer (3) of aluminum having a thickness of 10 microns, a second layer (4) of a material comprising the composite positive electrode, having a thickness of 15 microns, a layer (5) of solid polymer electrolyte with a thickness of 30 microns, and a layer (6) of lithium with a thickness of 30 microns, comprising the negative electrode. On each side of the four-layer assembly there are collector plates (7) for collection of the negative current and collector plates (8) for collection of the positive current.

In this embodiment, the composite positive electrode is formed by agglomeration of a more or less compact mass of electrolyte material with ion conduction, of an electrochemically active material and of carbon black. The electrochemically active material is comprised, in the present case, of vanadium oxide.

The macromolecular material with ion conduction used for the electrolyte and the electrode is comprised of a lithium salt dissolved in a copolymer of ethylene oxide.

The assembly also comprises a polypropylene film (10) which plays the role of a lithium carrier during production and of insulation between the positive electrode and the negative electrode during production of the generator by coiling, this film having a thickness of 10 microns.

Figure 2:
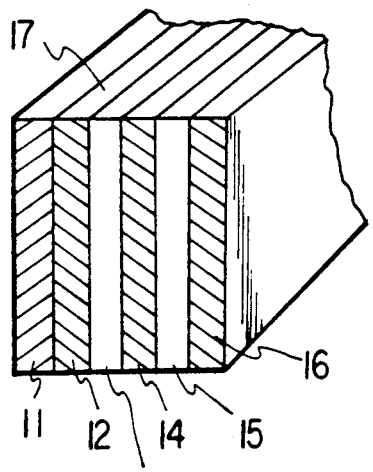
FIG. 2 is a schematic view of the structure of a multi-layer assembly according to the first method of implementation of the second embodiment of the invention.

FIG. 2 shows a multi-layer assembly produced according to the first method of implementation of the second embodiment mentioned above. This multi-layer assembly (17) comprises a layer (11) of a metal with low ductility, for example aluminum, a composite positive electrode layer (12), a solid polymer electrolyte layer (13), a layer (14) of lithium comprising the negative electrode, a solid polymer electrolyte layer (15) and finally, a composite positive electrode layer (16), these various layers having the same thicknesses as those in the assembly of FIG. 1.

This assembly (17) is intended to be coiled up in the same manner as shown schematically in FIG. 1, on a cylindrical mandrel, or possibly on a plate, in such a way as to obtain the equivalent of a flattened cylinder.

Figure 3:
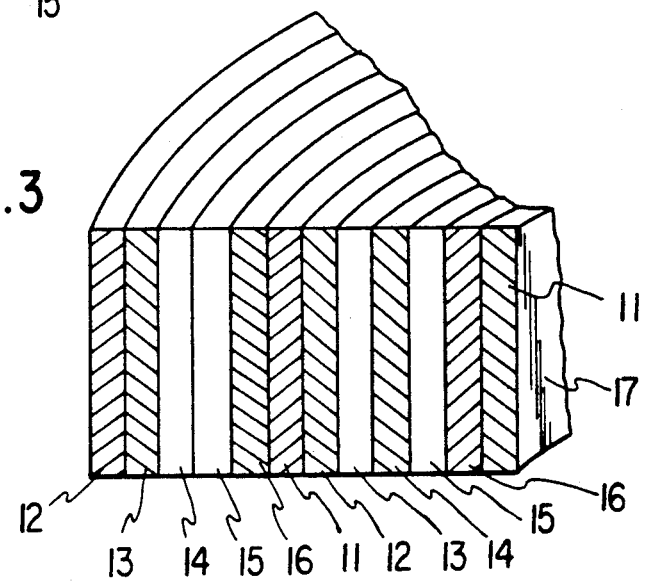
FIG. 3 represents the juxtaposition of the layers obtained during coiling of the assembly according to FIG. 2.

FIG. 3 shows the juxtaposition of the layers obtained during coiling. It will be noted on this FIG. 3 that a symmetrical assembly is obtained relative to the layer (11) of collector material, and that the collector material plays the role of the electricity collector for the two positive electrodes (12) and (16), between which it is sandwiched, this assembly also being symmetrical relative to the lithium layer (14). Thus, these two metallic layers are used on both their sides, which makes it possible to reduce the mass and relative volume of the material with low ductility, which does not make any contribution to the energy capacity of the generator produced, to a minimum.

Figure 4:
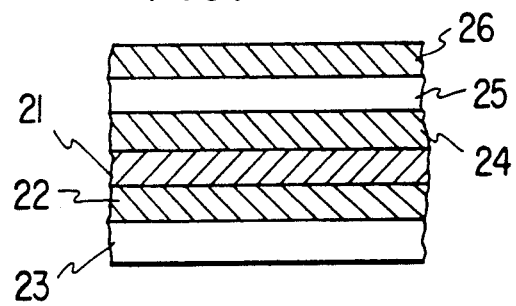
FIG. 4 represents a multi-layer assembly according to the second method of implementation of the second embodiment of the invention.

FIG. 4 shows a multi-layer assembly produced according to the second method of implementation of the second embodiment mentioned above, this multi-layer assembly comprising a layer (21) of a metal with low ductility, for example aluminum, which acts as a collector. On one side of the said layer (21) there is a layer (22) of composite positive electrode material, covered with a layer (23) of solid polymer electrolyte material. On the other side of the layer (21) there is a layer (24) of composite positive electrode material, a layer (25) of solid polymer electrolyte material, and a layer (26) of lithium acting as the negative electrode.

During coiling of such an assembly, the electrolyte layer (23) comes into contact with the layer (26) of the negative electrode material. This also makes it possible to utilize the metal of the negative electrode to the maximum, since it is in contact with an electrolyte on both its sides, and the same is true for the metal collector of the positive electrode, which is also used on both its sides.

Figure 5:
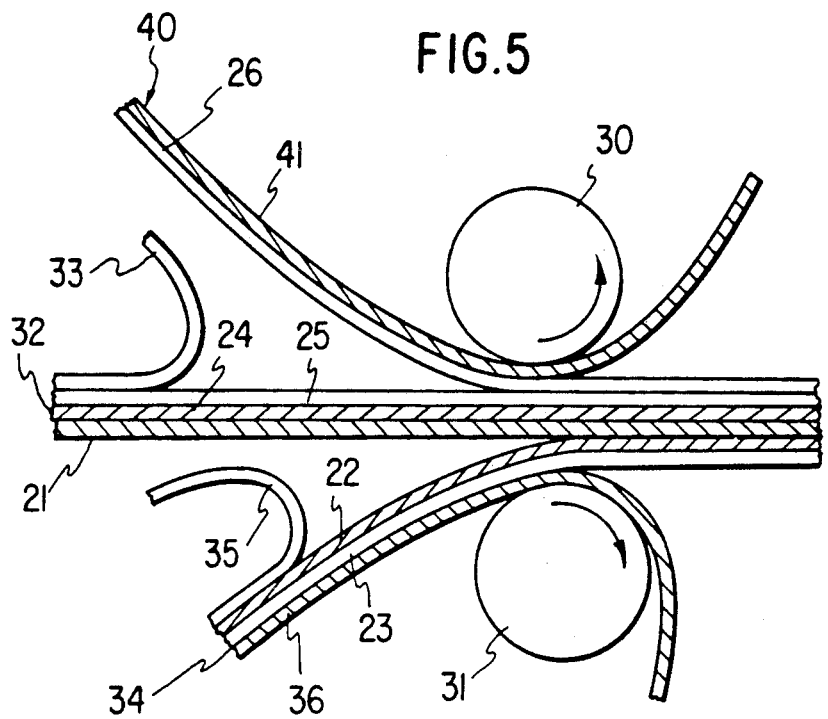
FIG. 5 gives the installation schematic which allows production of the assembly according to FIG. 4.

FIG. 5 shows an installation which allows production of the assembly shown in FIG. 4. This installation comprises two rollers (30) and (31) between which the various layers are co-laminated in the following manner.

First of all, an assembly (32) comprising a metal collector layer (21), a positive electrode layer (24) and an electrolyte layer (25), this electrolyte layer (25) being covered with a layer of plastic material (33) which is easy to remove was produced. On the other hand, a sub-assembly (34) comprising a positive electrode layer (22) associated with an electrolyte layer (23) was produced, the two layers being sandwiched between two layers (35) and (36) of an easy-to-remove material, such as polypropylene or polyethylene. In the same manner, a sub-assembly (40) comprising a lithium layer (26) associated with an easy-to-remove material was produced. The three sub-assemblies (40), (32) and (34) produced in this way are brought between the two rollers (30) and (31) after the easy-to-remove material has been removed, as well as layer (35). After pressing between the two rollers and production of the assembly, the layers (41) and (36) of easy-to-remove material are removed.

Figure 6:
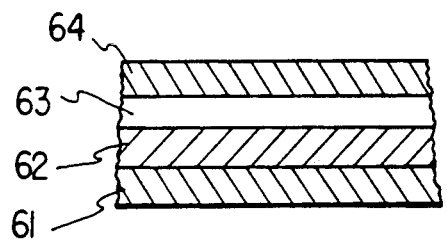
FIG. 6 is a schematic view of the structure of a multi-layer assembly according to the first embodiment, where the layer of lithium or lithium-base alloy is in contact with the layer of metal with low ductility.

The multi-layer assembly shown in FIG. 6 comprises four layers, specifically a nickel layer (61), a layer (62) of lithium which acts as a negative electrode, a layer (63) of solid polymer electrolyte and a layer (64) of a composite positive electrode, the said layers having analogous thicknesses to those given for the multi-layer assemblies defined above.

Figure 7:
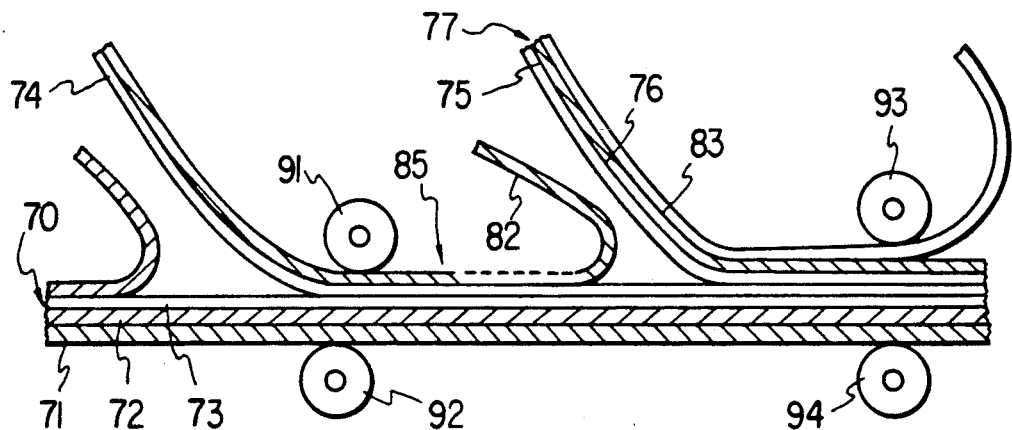
FIG. 7 represents an installation for production of a multi-layer assembly according to FIG. 2.

FIG. 7 shows an installation which allows production of the multi-layer assembly defined in FIG. 2, the said installation comprising two pairs of rollers, specifically a first pair formed of the rollers (91) and (92) and a second pair comprised of the rollers (93) and (94).

First of all, a first multi-layer sub-assembly (70) comprising an aluminum layer (71), a layer (72) of positive electrode material and an electrolyte layer (73) was produced. This assembly was produced by a technique of spreading as described in the aforementioned patent application.

On the other hand, a single-layer assembly of lithium (74) was produced on a polypropylene carrier.

The two assemblies produced in this way are then brought between the rollers (91, 92) in such a way as to be assembled in the same manner as described with reference to FIG. 5. In this way, an intermediary assembly (85) is obtained, the structure of which is comparable to that of the multi-layer assembly shown in FIG. 1.

On the other hand, a second multi-layer sub-assembly (77) is produced, comprising a layer of positive electrode material (76) and an electrolyte layer (75), this assembly being in contact with a layer of polypropylene (83) on the free side of the layer of positive electrode material. This second assembly is put into contact with the intermediary assembly (85) after the layer of polypropylene (82) has been removed.

The intermediary assembly with four layers or partial assembly (85) in itself comprises a complete electrochemical generator, in which the lithium layer (74) acting as the negative collector and the aluminum layer (71) acting as the positive collector each work on only one of their sides. If it is desired to use the generator as such in a coiled or folded form, it is necessary to keep the polypropylene film (82) associated with the lithium in place, in order to prevent the lithium from coming into contact with the collector (71) during coiling, which would create a short circuit. On the other hand, if it is desired to obtain a generator which associates several multi-layer assemblies (85) in an electrochemical series, the polypropylene film (82) must be peeled away and the assemblies stacked in such a manner as to associate one negative electrode (74) with each free side of the metal (71), the latter first having been chosen from among metals with low ductility which do not react with lithium, for example nickel, copper, stainless steel.

Figure 8:
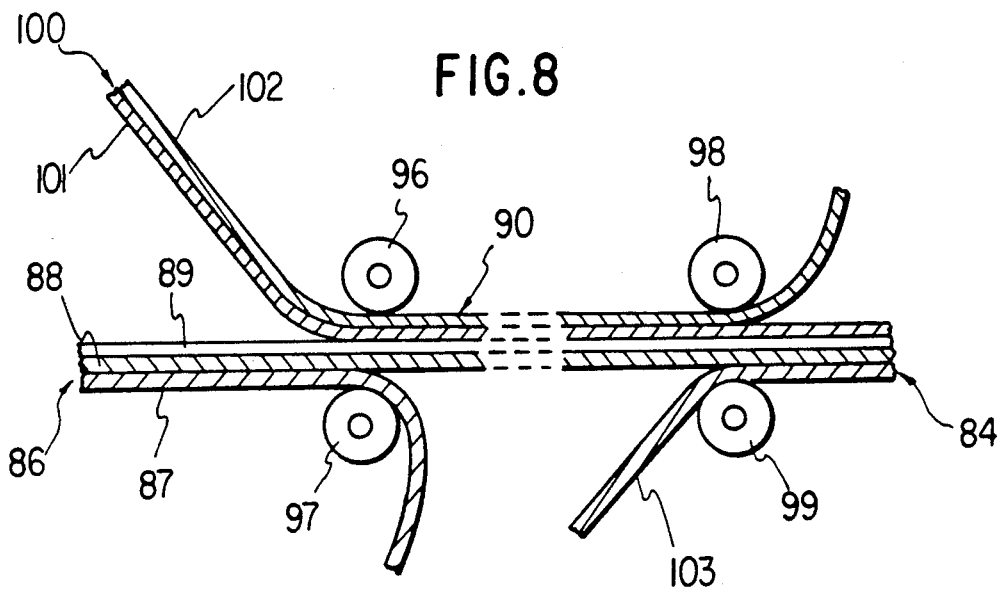
FIG. 8 represents an installation for production of a multi-layer assembly according to FIG. 1.

FIG. 8 shows an installation which allows production of a multi-layer assembly (84) analogous to that defined in FIG. 1 and also to the partial assembly (85) of FIG. 7. The installation of FIG. 8 comprises a first pair of rollers (96) and (97) and a second pair of rollers (98) and (99). First of all, an electrolyte/electrode sub-assembly (86) carried on a layer (87) formed of a peel-away plastic film, for example polypropylene, is produced, the said sub-assembly being comprised of a composite positive electrode layer (88) covered by a solid polymer electrolyte layer (89). On the other hand, a sub-assembly (100) comprised of a lithium layer (101) associated with a peel-away plastic film (102) also of polypropylene is produced. The sub-assembly (100) is then applied, on the lithium side, to the solid polymer electrolyte (89) of the sub-assembly (86), by lamination between the rollers (96) and (97), to form a partial or intermediary assembly (90). After peeling off the plastic film (87), the intermediary assembly (90) is combined, on the positive electrode side (88), with a layer (103) of metal with low ductility, particularly aluminum, by lamination between the rollers (98) and (99). At the exit from the said rollers, the plastic film (102) is pulled off and the multi-layer assembly (84) with four layers is obtained.

This multi-layer assembly (84) can be utilized, before or after removal of the peel-away plastic film, as indicated for the intermediary assembly (85) of FIG. 7.

Figure 9:
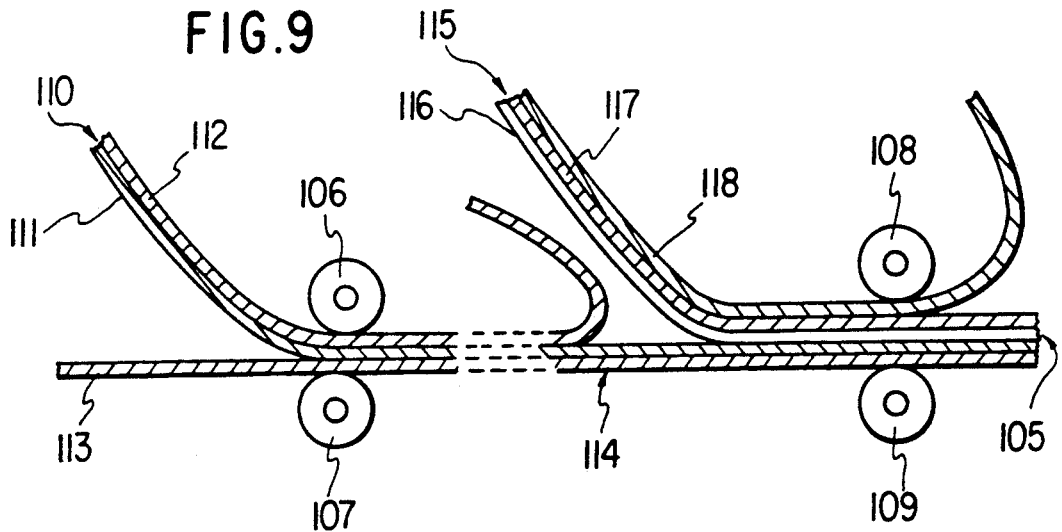
FIG. 9 represents an installation for production of a multi-layer assembly according to FIG. 6.
Figure 1:
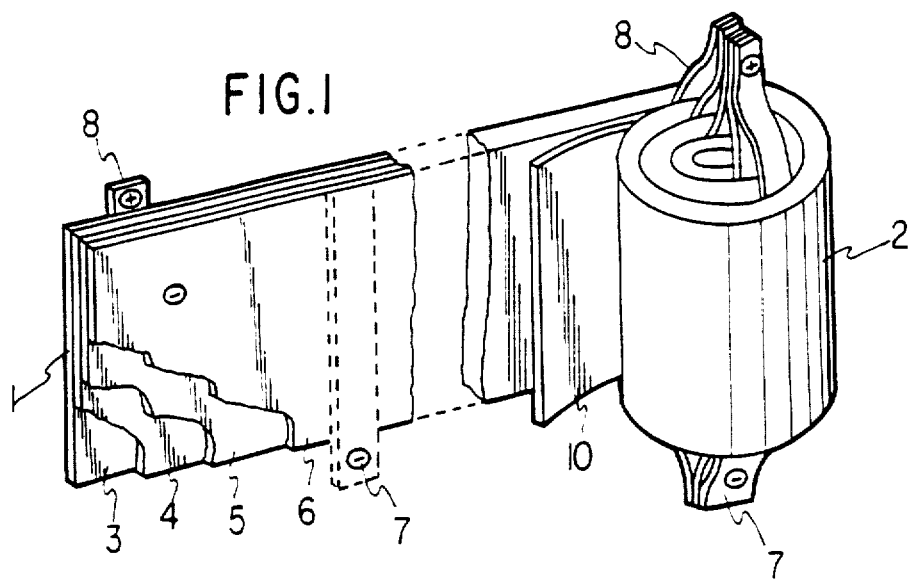
Figure 2:
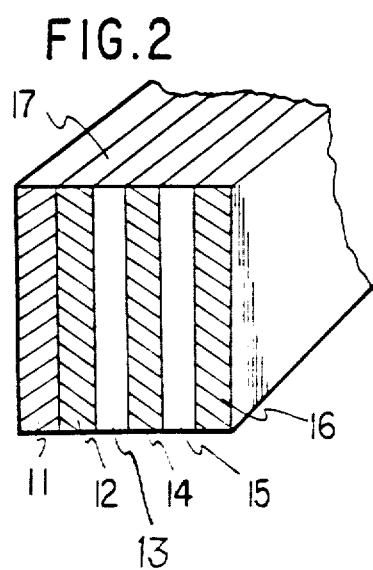
Figure 4:
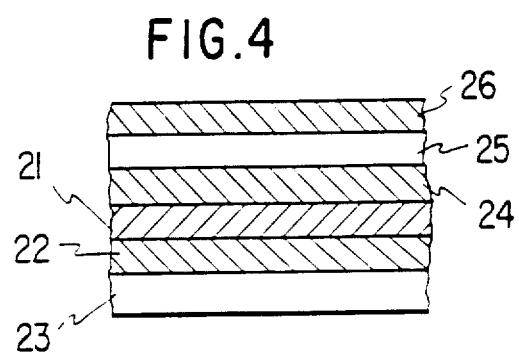
Figure 3:
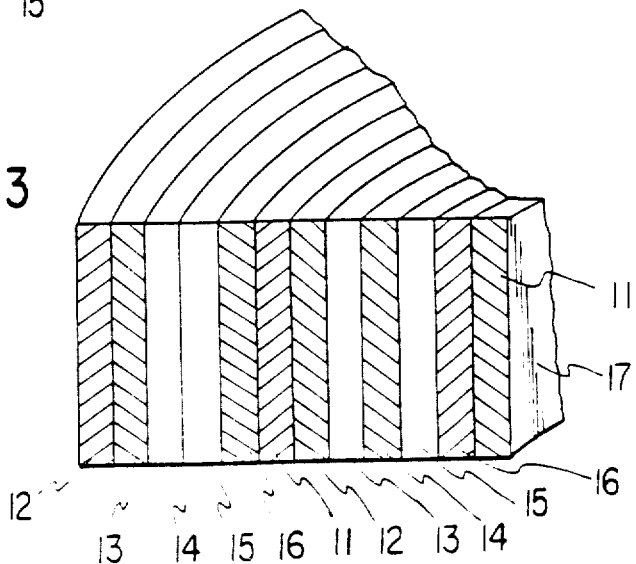

FIG. 9 shows an installation which allows production of a multi-layer assembly (105) analogous to that defined schematically in FIG. 6. The said installation comprises a first pair of rollers (106) and (107) and a second pair of rollers (108) and (109). First of all, a sub-assembly (110) formed of a lithium layer (111) carried on a peel-away plastic film (112), for example polypropylene, is produced. The sub-assembly is then pressed, on the lithium side, to a layer (113) of metal with low ductility which does not react with lithium, for example nickel, by lamination between the rollers (106) and (107). After the plastic film (112) is peeled off, an electrolyte/electrode sub-assembly (115) is applied to the intermediary assembly (114) formed, with the electrolyte side facing the lithium, the said sub-assembly being comprised of a solid polymer electrolyte layer (116) covered by a composite positive electrode layer (117) and being supported by a peel-away plastic film (118) of polypropylene, the intermediary assembly (114) and the supported sub-assembly (115) being combined by lamination between the rollers (108) and (109). At the exit from the said rollers, the plastic film (118) is pulled off and a multi-layer assembly (105) with four layers is obtained, which is a complete generator with a free positive electrode.

By superimposing an assemblies (105) and applying positive collector to the last free layer of positive electrode, a generator is obtained with a voltage equal to n times that of a single assembly (105). Since the free positive electrode does not adhere to the free side of the negative electrode collector, that is, the layer (113) of metal with low ductility such as nickel, before heating, the groupings of n single cells (105) can be coiled up or folded, and to not become adhesive until heating.

The assemblies (105) can also be used to produce assemblies in parallel. To do this, an assembly (105) is applied to each of the sides of a layer of metal with low ductility, for example aluminum or also nickel, copper or stainless steel, working, for example, by lamination between two rollers in such a way that the positive electrode layer of each assembly (105) is in contact with the metal with low ductility. The system formed in this way therefore comprises two external negative electrode collectors, specifically the layers (113) of metal with low ductility which is inert with regard to lithium, and a central positive electrode collector in contact, on both sides, with the positive electrode formed by the layer (117) of the composite positive electrode of the assembly (105) which is applied to the said side.

It is understood that the invention is not limited to the embodiments described and represented, but on the contrary encompasses numerous variations, particularly with regard to the production of the initial sub-assemblies and intermediary assemblies, which can be carried by one or also by two peel-away plastic films, the two films being either identical or different.

We claim:

1. A multi-layer assembly for carrying out assembly, by coiling, stacking or folding, of thin-film electrochemical generators with solid polymer electrolyte, includes a layer of metal with low ductility and another five layers, said five layers comprising two composite positive electrode layers, two solid polymer electrolyte layers and one layer of lithium or ductile lithium-base alloy, the five layers being arranged in such a manner in the multi-layer assembly that at least one of the two solid polymer electrolyte layers is separated from the layer of metal with low ductility by a composite positive electrode layer, and that the layer of lithium or ductile lithium-base alloy is separated from at least one composite positive electrode layer by a solid polymer electrolyte layer.

2. A multi-layer assembly according to claim 1, wherein the two composite positive electrode layers, the two solid polymer electrolyte layers and the layer of lithium or ductile lithium-base alloy are located on the same side of the layer of metal with low ductility.

3. A multi-layer assembly according to claim 2, wherein one composite positive electrode layer, one solid polymer electrolyte layer and the layer of lithium or ductile lithium-base alloy are arranged on the same side of the layer of metal with low ductility, while one composite positive electrode layer and one solid polymer electrolyte layer are arranged on the other side of the layer of metal with low ductility.

4. A multi-layer assembly for carrying out assembly, by coiling, stacking or folding, of thin-film electrochemical generators with solid polymer electrolyte, comprising a layer of metal with low ductility and another three layers, said three layers comprising a composite positive electrode layer, a solid polymer electrolyte layer and a layer of lithium or ductile lithium-base alloy, wherein said solid polymer electrolyte is sandwiched between the composite positive electrode layer and the layer of lithium or ductile lithium-base alloy, and wherein the layer of metal with low ductility is in contact with the layer of lithium or ductile lithium-base alloy, the metal with low ductility being one which does not react with lithium.

5. A thin-film lithium electrochemical generator produced by a technique of coiling, stacking or folding, based on at least one of the multi-layer assemblies according to one of claims 1 to 4.

6. A generator according to claim 5, obtained by coiling or folding a multi-layer assembly or by stacking a plurality of such multi-layer assemblies.

7. A generator according to claim 5, obtained by stacking a plurality of multi-layer assemblies, with the layer of metal with low ductility on top of the electrode layer of the adjacent assembly, and by applying a positive electrode collector tot he last free layer of a positive electrode.

8. A generator according to claim 5, obtained by applying a multi-layer assembly to each of the sides of a layer of metal with low ductility, working in such a way that the positive electrode layer of each of the assemblies applied to the layer of metal with low ductility comes into contact with the said metal.

9. A process for the production of a multi-layer assembly which can be used for the assembly, by stacking, coiling or folding, of thin-film lithium electrochemical generators having a solid polymer electrolyte, which comprises:
 a) producing an electrolyte/electrode sub-assembly, which has the form of a two-layer assembly comprising a solid polymer electrolyte layer adhered to a composite positive electrode layer and which is supported, on the electrode side, on a carrier consisting of peel-away plastic film made of an inert plastic material and having good mechanical resistance,
 b) applying a layer of lithium or of a ductile alloy based on lithium to the electrolyte layer of the supported electrode/electrolyte sub-assembly,
 c) removing the plastic film which covers the electrode layer of the said sub-assembly, and
 d) applying the layer of metal with low ductility to the said electrode layer.

10. A process according to claim 9 wherein the layer of lithium or ductile lithium-base alloy which is applied to the supported electrolyte/electrode sub-assembly is also supported by a peel-away plastic film which covers the side of the layer which does not come into contact with the sub-assembly.

11. A process according to claim 9 wherein the electrolyte side of a second electrolyte/electrode sub-assembly is applied to the layer of lithium or ductile lithium-base alloy.

12. A process according to claim 9 wherein the electrode side of a second electrolyte/electrode sub-assembly is applied to the free side of the layer of metal with low ductility.

13. A process according to one of claims 11, 12 or 9 wherein application one on the other of the electrolyte/electrode sub-assembly or sub-assemblies, of the layer of lithium or ductile lithium-based alloy, and of the layer of metal with low ductility, is carried out by lamination between rollers of at least one pair of rollers.

14. A process according to claim 12, wherein the second sub-assembly which is applied to the free side of the layer of metal with low ductility is also covered by a peel-away plastic film on the electrode side, which is removed before this application is carried out.

15. A process according to claim 10, wherein the electrolyte side of a second electrolyte/electrode sub-assembly is applied to the layer of lithium or ductile lithium-based alloy, after having removed the plastic film covering the said layer.

16. A process according to claim 11, wherein said second sub-assembly is supported on a peel-away plastic film, which is removed at the end of the operation.

17. A process according to claim 12, wherein said second sub-assembly is supported on a peel-away plastic film, which is removed at the end of the operation.

18. A process according to claim 15, wherein said second sub-assembly is supported on a peel-away plastic film, which is removed at the end of the operation.

19. A process according to claim 17, wherein the second sub-assembly which is applied to the free side of the layer of metal with low ductility is also covered by a peel-away plastic film on the electrode side, which is removed before this application is carried out.

20. A process according to claim 9 or 10 or 14, wherein each peel-away plastic film is made of polyethylene or polypropylene.

21. A process according to claim 16 or 18 or 17 or 19, wherein each peel-away plastic film is made of polyethylene or polypropylene.

22. A process according to claim 9 or 11 or 14, wherein the layer of metal with low ductility is made of a metal selected from the group consisting of nickel, copper, aluminum and stainless steel.

23. A multi-layer assembly obtained by the process of claim 9 or 11 or 12.

24. A thin-film lithium electrochemical generator obtained by coiling or folding a multi-layer assembly obtained by the process of claim 11 or 12 or by stacking a plurality of such multi-layer assemblies.

25. A process for the production of a multi-layer assembly which can be used for the assembly, by stacking, coiling or folding, of thin-film lithium electrochemical generators having a solid polymer electrolyte, which comprises:
 a) producing an electrolyte/electrode sub-assembly, which has the form of a two-layer assembly comprising a solid polymer electrolyte layer adhered to a composite positive electrode layer and which is supported, on the electrode side, on a carrier made of a metal with low ductility, and
 b) applying by lamination between at least two rollers a layer of lithium or of a ductile alloy based on lithium to the electrolyte layer of the supported electrode/electrolyte sub-assembly.

26. A process according to claim 25 wherein the layer of lithium or ductile lithium-base alloy which is applied to the supported electrolyte/electrode sub-assembly is also supported by a peel-away plastic film which covers the side of the layer which does not come into contact with the sub-assembly.

27. A process according to claim 25 wherein the electrolyte side of a second electrolyte/electrode sub-assembly is applied to the layer of lithium or ductile lithium-base alloy.

28. A process according to claim 25 wherein the electrode side of a second electrolyte/ electrode sub-assembly is applied to the free side of the layer of metal with low ductility.

29. A process according to claim 28, wherein the second sub-assembly which is applied to the free side of the layer of metal with low ductility is also covered by a peel-away plastic film on the electrode side, which is removed before this application is carried out.

30. A process according to claim 26, wherein the electrolyte side of a second electrolyte/electrode sub-assembly is applied to the layer of lithium or ductile lithium-based alloy, after having removed the plastic film covering the said layer.

31. A process according to claim 27, wherein said second sub-assembly is supported on a peel-away plastic film, which is removed at the end of the operation.

32. A process according to claim 30, wherein said second sub-assembly is supported on a peel-away plastic film, which is removed at the end of the operation.

33. A process according to claim 28, wherein said second sub-assembly is supported on a peel-away plastic film, which is removed at the end of the operation.

34. A process according to claim 33 wherein the second sub-assembly which is applied to the free side of the layer of metal with low ductility is also covered by a peel-away plastic film on the electrode side, which is removed before this application is carried out.

35. A process according to claim 25 or 26 or 29, wherein each peel-away plastic film is made of polyethylene or polypropylene.

36. A process according to claim 30 or 31 or 32 or 33, wherein each peel-away plastic film is made of polyethylene or polypropylene.

37. A process according to claim 25 or 26 or 28, wherein the layer of metal with low ductility is made of a metal selected from the group consisting of nickel, copper, aluminum and stainless steel.

38. A multi-layer assembly obtained by the process of claim 25, or 27 or 28.

39. A thin-film lithium electrochemical generator obtained by coiling or folding a multi-layer assembly obtained by the process of claim 27 or 28 or by stacking plurality of such multi-layer assemblies.

40. A process for the production of a multi-layer assembly which can be used for the assembly, by stacking, coiling or folding, of thin-film lithium electrochemical generators having a solid polymer electrolyte, which comprises:
 a) applying on both sides of a carrier consisting of a layer of a metal with low ductility the electrode side of an electrolyte/electrode sub-assembly, said sub-assembly having the form of a two-layer assembly comprising a solid polymer electrolyte layer adhered to a composite positive electrode layer, and
 b) applying a layer of lithium or of a ductile alloy based on lithium to one of the electrolyte/electrode sub-assemblies associated with the layer of metal with low ductility.

41. A process according to claim 40, wherein the layer of lithium or ductile lithium-based alloy is supported by a peel-away plastic film, which covers that side of said layer which does not come into contact with the electrolyte, and which is removed at the end of the operation.

42. A process according to claim 40, wherein each electrode/electrolyte sub-assembly is supported on the electrolyte side by a peel-away plastic film, which is removed at the end of the operation.

43. A process according to claim 41, wherein the application of the electrolyte/electrode sub-assemblies to the layer of metal with low ductility and the application of the layer of lithium or of ductile lithium-based alloy to one of the electrode/electrolyte sub-assemblies associated with the layer of metal with low ductility are each carried out by lamination between at least two rollers.

44. A process according to claim 42, wherein the layer of metal with low ductility is made of a metal selected from the group consisting of nickel, copper, aluminum and stainless steel.

45. A process according to claim 41 or 42, wherein the peel-away plastic film is made of polyethylene or polypropylene.

46. A multi-layer assembly obtained by the process of claim 45.

47. A thin-film lithium electrochemical generator obtained by stacking a plurality of multi-layer assemblies according to claim 46, with the layer of metal with low ductility on top of the electrode layer of the adjacent assembly, and by applying a positive electrode collector to the last free layer of a positive electrode.

48. A thin-film lithium electrochemical generator obtained by applying a multi-layer assembly according to claim 46, to each of the sides of a layer of metal with low ductility, working in such a way that the positive electrode layer of each of the assemblies applied to the layer of metal with low ductility comes into contact with said metal.

49. A multi-layer assembly obtained by the process of claim 40.

50. A thin-film lithium electrochemical generator obtained by coiling or folding a multi-layer assembly according to claim 49 or by stacking a plurality of such multi-layer assemblies.

51. A process for the production of a multi-layer assembly which can be used for the assembly, by stacking, coiling or folding, of thin-film lithium electrochemical generators having a solid polymer electrolyte, which comprises:
 a) applying a layer of lithium or of a ductile alloy based on lithium to one of the sides of a layer of a metal with low ductility which does not react with lithium, and
 b) applying to said layer of lithium or ductile lithium-based alloy the electrolyte side of an electrolyte/electrode sub-assembly which has the form of a two-layer assembly comprising a solid polymer electrolyte layer adhered to a composite electrode layer.

52. A process according to claim 51, wherein the layer of lithium or ductile lithium-based alloy is supported by a peel-away plastic film which covers the side of said layer which does not come into contact with the metal with low ductility, said film being removed before application of the electrolyte/electrode sub-assembly.

53. A process according to claim 51, wherein the electrolyte/electrode sub-assembly is supported on the electrode side by a peel-away plastic film, which is removed, or not, at the end of the operation.

54. A process according to claim 51, wherein the application of the lithium or ductile lithium-based alloy to the layer of metal with low ductility and the application of the electrolyte/electrode sub-assembly to the layer of lithium or ductile lithium-based alloy are each performed by lamination between at least two rollers.

55. A process according to claim 51, wherein the layer of metal with low ductility is made of a metal selected from the group consisting of nickel, copper and stainless steel.

56. A process according to claim 52 or 53, wherein the peel-away plastic film is made of polyethylene or polypropylene.

* * * * *

UNITED STATES PATENT AND TRADEMARK OFFICE
CERTIFICATE OF CORRECTION

PATENT NO. : 5,100,746  
DATED : 3/31/92  
INVENTOR(S) : Muller et al

Page 1 of 2

It is certified that error appears in the above-indentified patent and that said Letters Patent is hereby corrected as shown below:

Sheet 1, of the drawings, Fig. 2, should be deleted to appear as shown on the attached page.

At column 4, line 40, change "and", first occurrence to --of--;
        line 50, "ductility to the solid polymer electrolyte
                layer of the" should read:
                      --ductility to the positive electrode layer of the--.

At column 10, line 15, change "an" to --an--.

At column 10, Claim 3, line 67, change "2" to --1--.

At column 11, Claim 7, line 33, "tot he" should read --to the--.

At column 13, Claim 39, line 53, after "stacking" add --a--.

Signed and Sealed this

Twenty-sixth Day of October, 1993

Attest:

BRUCE LEHMAN

Attesting Officer          Commissioner of Patents and Trademarks